United States Patent [19]

Yagi et al.

[11] 3,749,850

[45] July 31, 1973

[54] MAGNETIC HEAD HAVING A WEDGE SHAPED PROJECTION EXTENDING OVER VOID SPACE BETWEEN CORE HALVES

[75] Inventors: Motoi Yagi, Zushi; Yoshihisa Kawamura, Chigasaki, both of Japan

[73] Assignee: Tokyo Shibaura Electric Co., Ltd., Kawasaki-shi, Japan

[22] Filed: Dec. 15, 1971

[21] Appl. No.: 208,171

Related U.S. Application Data

[62] Division of Ser. No. 835,631, June 23, 1969, Pat. No. 3,648,361.

[30] Foreign Application Priority Data

June 26, 1968 Japan ............................. 43/43929
Dec. 5, 1968 Japan ............................. 43/88641
June 28, 1968 Japan ............................. 43/54343

[52] U.S. Cl. .................... 179/100.2 C, 340/174.1 F
[51] Int. Cl. .......................................... G11b 5/22
[58] Field of Search ........................... 179/100.2 C; 340/174.1 F; 346/74 MC; 29/603

[56] References Cited

UNITED STATES PATENTS

| | | | |
|---|---|---|---|
| 3,402,463 | 9/1968 | Bos et al. | 179/100.2 C |
| 3,557,266 | 1/1971 | Chiba et al. | 179/100.2 C |
| 3,502,821 | 3/1970 | Duinker | 179/100.2 C |
| 3,435,155 | 3/1969 | Van Der Voo | 179/100.2 C |
| 3,495,325 | 2/1970 | Bos et al. | 179/100.2 C |
| 3,529,349 | 9/1970 | Van De Schoot et al. | 179/100.2 C |
| 2,632,816 | 3/1953 | Gratian | 179/100.2 C |

*Primary Examiner*—Bernard Konick
*Assistant Examiner*—Alfred H. Eddleman
*Attorney*—Robert D. Flynn, Leonard Holtz et al.

[57] ABSTRACT

A magnetic head used for recording and reproduction in a tape recorder includes two core halves or pole pieces abutting against each other and between the core halves are formed a hard non-magnetic spacer and a void space. The core halves are designated in turn as first and second core halves as counted in the travelling direction of the tape. A wedge-shaped lip on the tape-contacting surface of the first core half extends in the travelling direction of the tape in a manner to cover the void space between the core halves.

7 Claims, 4 Drawing Figures

MAGNETIC HEAD HAVING A WEDGE SHAPED PROJECTION EXTENDING OVER VOID SPACE BETWEEN CORE HALVES

This is a Division of U.S. Ser. No. 835,631, filed on June 23, 1969, now U.S. Pat. No. 3,648,361, issued on Mar. 14, 1972.

The present invention relates to improvements in magnetic heads and more particularly for magnetic heads used in recording and reproduction in magnetic tape machines.

It is required in the recording art that, for example, at the time of recording of a video signal, the current signal be changed to a magnetic signal without attenuation and thereafter efficiently recorded on a magnetic medium. Also, at the time of reproduction, it is important that the recorded video signal be efficiently changed to a current signal. Further, it is required that a video signal having as wide a frequency band as possible be recorded and reproduced.

To meet these requirements, it is necessary to decrease the size of the head gap. However, reduction in size of the head gap will lead to noticeable leakage of a magnetic flux at the head depth with the resultant decrease of sensitivity. Accordingly, the head gap was practically determined by its relationship to the head depth. Compensation was made for the difficulties associated with the gap and depth by accelerating the travelling speed of the magnetic tape relative to the head. However, the high speed travel of the tape had the drawback of reducing the recording capacity of the recorder. To eliminate such shortcomings, various attempts were made to improve the head gap. One approach to this end consists in preparing a magnetic head which has core halves with a soft and a hard spacer interposed therebetween. Such magnetic head is defective in that the soft spacer will, after long use of the magnetic head, be deformed and will roughen the tape contacting surface with a resultant degradation of the linearity of the head gap, thus causing the magnetic head to fail in displaying a stable high performance.

It is an object of the present invention to provide a magnetic head which is improved in electric-magnetic conversion efficiency, and which maintains stable sensitivity and performance even when used with tape moving at very high speeds relative to the head.

SUMMARY OF THE INVENTION

The magnetic head of the present invention has a tape contacting side and comprises first and second core halves facing each other, the facing surfaces of the core halves being substantially perpendicular to the tape contacting side of the head. The core halves are designated in turn as first and second core halves as counted in the travelling direction of the tape which is to be passed over the head. A layer of hard non-magnetic material is interposed between the facing surfaces of the core havles, and a void space is formed between the layer of hard non-magnetic material and one of the core halves. A wedge-shaped projection extends from the first core half to the second core half along the tape contacting surface of the head to cover the void space.

BRIEF DESCRIPTION OF THE DRAWINGS

There will now be described a magnetic head according to an embodiment of the present invention with reference to the appended drawing. Referring to FIG. 1, a magnetic head 9 comprises core halves or pole pieces 10 and 11 made of a magnetic material of high magnetic permeability such as sendust alloy. The core half 10 is wound with a coil 12, and between the core halves 10 and 11 are interposed, as shown, a void space 13 and a layer 14. The void space 13 is formed so narrow as to be covered with a portion of the first core half flowed by a plastic flow and has a desirable depth and a width substantially constant over the entire lengths of the non-magnetic layer and the first core half. The layer 14 consists of a thin foil of physically hard non-magnetic material such as beryllium and is deposited on that plane of the core half 11 facing the core half 10. On that side of the core half 10 which faces the void space 13 and which is brought into contact with a tape, there is formed a wedge-shaped lip 15 extending in the travelling direction of the magnetic tape so as to cover the void space 13.

Figure 1:
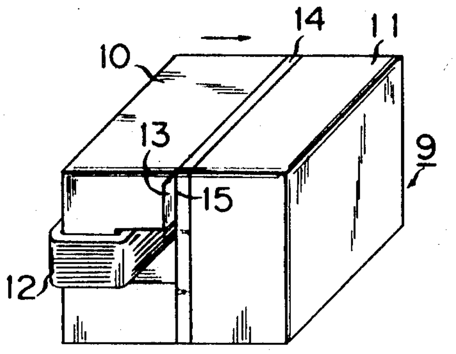
FIG. 1 is a perspective view of a magnetic head according to an embodiment of the invention.
Figure 2:
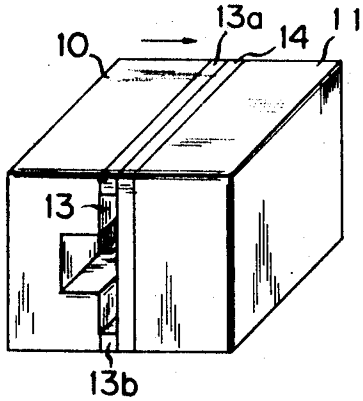
FIG. 2 is a perspective view of the body of a magnetic head of the present invention during the manufacturing process.
Figure 3:
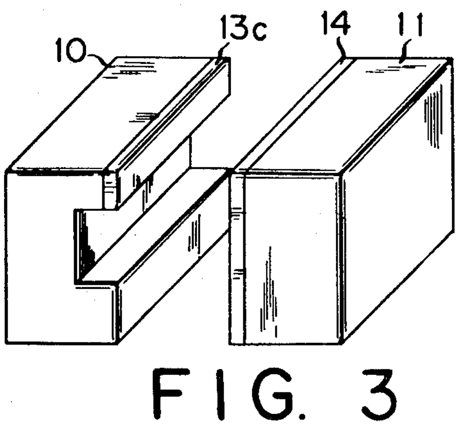
FIG. 3 is a perspective view of a dismembered magnetic head body of the present invention and illustrating another manufacturing method.
Figure 4:
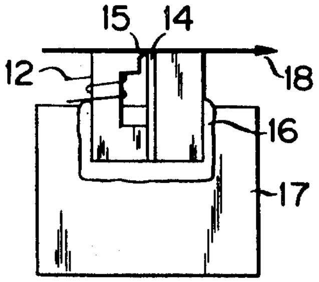
FIG. 4 illustrates the condition in which the magnetic head according to the invention is fitted to a substrate.

As described above, the head gap according to the present invention consist of a void space 13 and hard non-magnetic material 14 respectively. Since the void area is covered with the wedge-shaped lip 15 extending from the core half 10, there is obtained a magnetic head whose effective head gap actually consists of a hard non-magnetic material alone, so that the aforementioned shortcomings of the prior art are all eliminated. As described above, by virtue of the void space 13, there is always maintained a linear gap.

Further, the material of the surface of the core half 10 is made slowly to shift its position (this phenomenon is known as surface flow) in the travelling direction of a magnetic tape due to the force of said travel, thus always maintaining a narrow head gap. This enables recording or reproduction to be carried out with good frequency properties. Also, as described above, that part of the core half 10 forming a head gap is provided with the wedge-shaped lip 15, so that magnetic leakage is minimized with the resultant elevation of the sensitivity of the magnetic head during recording or reproduction. The magnetic tape moves along, as mentioned above, from the void space 13 to the spacer 14 made of a hard non-magnetic material, so that though the surface level of the core half 10 is reduced due to the friction caused by the sliding of a magnetic tape over said surface, the surface material of the core half 10 is not entirely worn away but is made to shift position, due to the aforesaid phenomenon of surface flow, to gradually form the wedge-shaped lip or projection 15. In consequence, the head gap always retains a prescribed form because of the presence of the spacer made of a hard non-magnetic material. This permits a magnetic head as a whole to have a prolonged useful life.

It is generally difficult to manufacture in large quantities a magnetic head having such a void space 13 as described hereinabove. However, such a head can be economically and advantageously fabricated according to the methods disclosed in U.S. Pat. No. 3,648,361, issued Mar. 14, 1972 of which the present application is a Division.

We claim:

1. A magnetic head having a tape contacting side, comprising:

a first core half of plastic flowable material;

a second core half facing said first core half, the facing surfaces of said first and second core halves being substantially perpendicular to said tape contacting side, said core halves being designated in turn as first and second core halves as counted in the travelling direction of the tape which is to be passed thereover;

a layer of hard non-magnetic material interposed between the facing surfaces of said first and second core halves;

a void space formed between said layer of hard non-magnetic material and said first core half, said void space being sufficiently narrow as to be covered with a portion of said first core half by a plastic flow, said void space being so defined between said layer of hard non-magnetic material and said first core half as to have a depth and a width which is substantially constant over the entire lengths of said layer of hard non-magnetic material and the first core half; and a wedge-shaped projection extending from said first core half to said layer of hard non-magnetic material and extending to said tape contacting side to cover said void space on said tape contacting side, said wedge shaped projection comprising core surface material flowed from the tape contacting surface of said first core half due to friction of the tape passing thereover.

2. The magnetic head according to claim 1 wherein the first and second core halves are formed of magnetic material of high magnetic permeability.

3. The magnetic head according to claim 1 wherein said layer of hard non-magnetic material extends to the tape contacting surface of said magnetic head.

4. The magnetic head according to claim 1 wherein said layer of hard non-magnetic material is adhered to said second core half.

5. The magnetic head according to claim 1 wherein the apex of said wedge-shaped projection extends to said second core half.

6. The magnetic head according to claim 1 including a substrate to which said core halves are attached.

7. A magnetic head according to claim 1 including a coil wound about at least one of said core halves.

* * * * *